Figure 1:
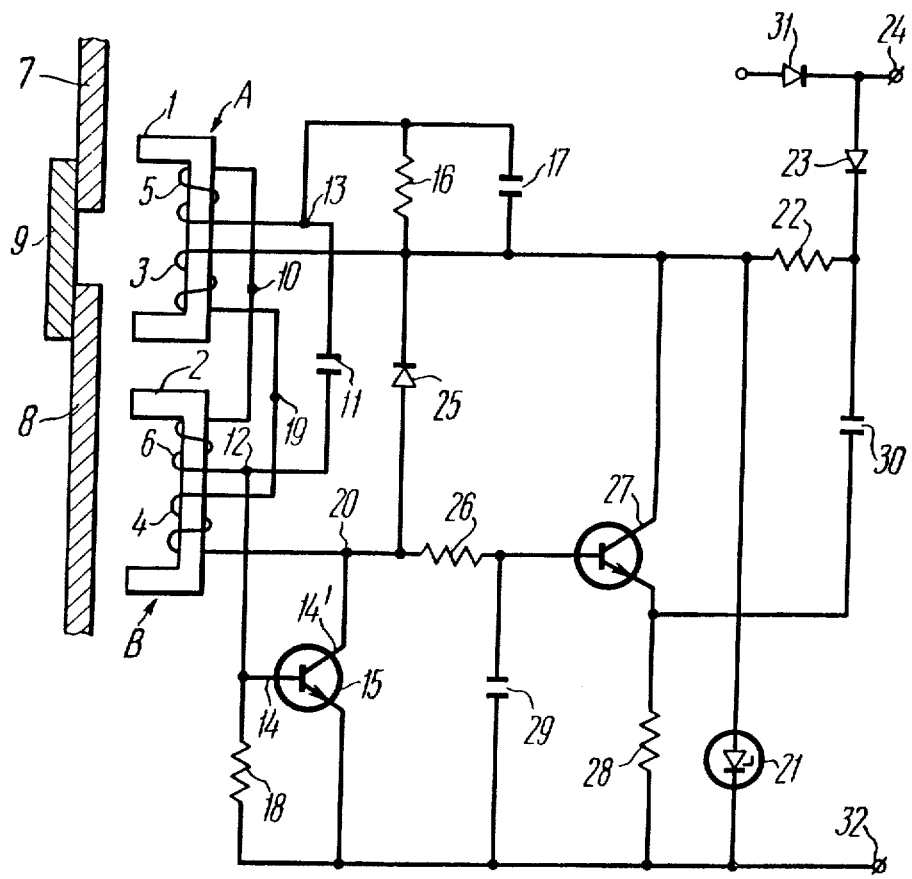

United States Patent
Abrukin

[11] 3,883,797
[45] May 13, 1975

[54] APPARATUS FOR CHECKING THE CONTINUITY OF METALLIC PIPES USING AN OSCILLATOR WHOSE FREQUENCY CHANGES AT DISCONTINUITIES

[76] Inventor: Abram Lvovich Abrukin, Vorobievskoe shosse, 11, kv. 5, Moscow, U.S.S.R.

[22] Filed: June 20, 1974

[21] Appl. No.: 481,404

[52] U.S. Cl................ 324/37; 166/65 M; 324/34 R
[51] Int. Cl............................................. G01r 33/12
[58] Field of Search................... 324/34 R, 37, 340; 166/65 R, 65 M; 331/65 R, 148

[56] References Cited
UNITED STATES PATENTS

| | | | |
|---|---|---|---|
| 2,686,039 | 8/1954 | Bender | 324/34 R |
| 2,782,365 | 2/1957 | Castel | 324/34 R |
| 2,896,155 | 7/1959 | Cook | 324/34 R |

Primary Examiner—Robert J. Corcoran

[57] ABSTRACT

The apparatus according to the invention may be used in the oil-recovery and gas industry.

The apparatus comprises means for inducing an alternating magnetic field in the pipe being checked and a converter for converting a change in the magnetic field into an electric signal, said means and said converter comprising two transformers mounted in a fixed position relative to each other and electrically coupled therebetween, and an electronic amplifier circuit with positive feedback formed by the transformer windings.

The magnetic circuits of the both transformers are completed by the body of the pipe being checked.

Upon the occurence of a discontinuity in the pipe being checked the magnetic flux values of the both transformers are changed so that the frequency of the output signal of the converter is also changed to obtain the information on the discontinuity of the metal of the pipe.

2 Claims, 3 Drawing Figures

APPARATUS FOR CHECKING THE CONTINUITY OF METALLIC PIPES USING AN OSCILLATOR WHOSE FREQUENCY CHANGES AT DISCONTINUITIES

The present invention relates to apparatus for flaw detection of metallic articles, and more particularly, to apparatus for checking-up the continuity of metallic pipes.

The present invention may be used in checking-up the continuity of metallic pipes to be used in the oil-recovery and gas industry. In accordance with the present invention it is possible to locate couplings, perforation holes in the pipes for supplying liquid into a borehole, as well as to reveal the locations of pipe ruptures.

Accurate location of discontinuities of metallic pipes in wells in the form of joints between the well casings, perforation holes, ruptures and indents in the pipes and the like is of a great practical importance in operating oil fields. In particular, it is very critical to accurately locate couplings in the casing strings which are used as bench marks employed as reference in the correlation of measured plots of various values (inflow, temperature, water content, etc.)

Known in the art are different apparatus for locating couplings and holes in well casings. Generally such apparatus comprise one or more inductance coils having a magnetic circuit, one or two permanent magnets for creating permanent magnetic field in the pipe being checked, the pipe closing the magnetic circuit. In certain cases these apparatus are provided with electronic or magnetic amplifiers. Such apparatus are responsive to changes in the magnetic field caused by couplings, pipe joints or holes in the pipes.

These apparatus operate on the basis of the induction of electromotive forces appearing upon a change in magnetic fluxes permeating the inductance coils, if there is a discontinuity in the pipe being checked. Thus, a change in the value of magnetic flux is caused by a change in the reluctance of the magnetic circuit of the inductance coils. The greater the degree of discontinuity of the metal in a pipe and the higher the speed of movement of the apparatus in the pipe, the greater the change in magnetic flux and the greater the intensity of DC pulses induced in the inductance coils.

The disadvantage of such apparatus consists in that their sensitivity depends on the speed of their movement. This is due to the fact that the value of the output signal depends on a change in the steepness of the magnetic flux permeating the inductance coils versus time, that is $$e = -W \, d\phi/dt$$

wherein
- $e$ is electromotive force induced in the inductance coil;
- $\phi$ is magnetic flux passing through the inductance coil;
- $t$ is time;
- $W$ is number of turns of the inductance coil.

Therefore, if the apparatus is in a fixed position adjacent to the point of discontinuity of metal, it will not "sense" it, that is the value of magnetic flux will not change, and there will be no output signal in the apparatus.

In addition, the accuracy of these apparatus not only depends on the discontinuity of metal, but also on eventual displacement of the apparatus in the direction normal to the direction of its movement. For that reason any jerks which cause the displacement of the apparatus towards the center of the pipe will result in the appearance of false signals at the output of the apparatus. This, in turn, requires the use of additional means urging the apparatus against the wall of the pipe being checked, since with a heavy weight of the apparatus the attractive force of the magnets becomes insufficient.

Another disadvantage of prior art apparatus for checking-up the continuity of metallic pipes consists in that it is impossible to employ a single-wire cable when such apparatus operate together with other remotely controlled instruments supplied with DC voltage, because the output signals of such prior art apparatus also comprise DC pulses. Considering the modern trend to construct comprehensive remotely controlled instruments which are capable of measuring several values during one and the same lowering of the instrument into a well, the employment of the above-described apparatus with such output signals is inadmissible.

It is an object of the present invention to provide an apparatus which permits to improve the checking-up of the continuity of metallic pipes in oil and gas wells.

Another object of the invention is to provide an apparatus for checking-up the continuity of metallic pipes which permits to conduct the measurements in combination with other remotely controlled instruments with the employment of a single-wire cable for transmitting output signals from each of several instruments.

Still another object of the invention is to provide an apparatus for checking-up the continuity of metallic pipes having an improved sensitivity and noise stability.

These and other objects are accomplished due to the fact that in an apparatus for checking-up the continuity of metallic pipes comprising means for inducing magnetic field in the pipe being checked, the magnetic field being changed upon the appearance of a discontinuity in said pipe, and a converter for converting the change of the magnetic field into an electric signal carrying the information on the presence of the discontinuity in the pipe, in accordance with the invention, said means for inducing magnetic field in the pipe being checked and said converter for converting the change of said field into an electric signal comprise two transformers mounted in a fixed position relative to each other and having open magnetic circuits which are completed during the check-up operation by the body of the pipe being checked, and an electronic amplifier circuit with positive feedback formed by the transformer windings in such a manner that the primary windings are matchingly connected and are coupled to the output of the electronic amplifier circuit, and the secondary windings having different number of turns are oppositely connected in series and coupled to the input of the electronic amplifier circuit, the ratio between the number of turns of the primary windings and the difference in the number of turns of the secondary windings complying with the condition $$K\beta > 1,$$

wherein $K$ is gain of the electronic amplifier circuit;

$\beta$ is resultant transformation ratio of the system of the interconnected transformers, whereby, upon the occurence of a discontinuity in the pipe, the frequency of the electric signal at the output of the electronic amplifier circuit is changed.

The apparatus according to the invention exhibits a high sensitivity which is substantially independent of the speed of movement of the apparatus in the pipe being checked, while having a low sensistivity to the displacement in the direction normal to the pipe axis.

Another advantage of the apparatus according to the invention consists in its simplicity, and in that the operating conditions and parameters of capacitors and resistors used in the circuit are not critical. The apparatus can be readily combined with other instruments, while the availability of the frequency conversion feature makes it convenient for remote measurements using a single-wire cable and eliminates the influence of the unstability of the communication channel on the measurement results.

It is known that single-wire cables are much more cheaper than multicore cables, and they are of a smaller diameter. A small diameter of the cable facilitates the lowering of the apparatus into a pressurized well.

The readings of the apparatus according to the invention are more accurate with the employment of screens of stainless steel surrounding the transformer windings, the sensitivity of the apparatus being improved in this case since the leakage fluxes become weaker.

The apparatus according to the invention may be used for flaw detection not only in metallic pipes, but also in other articles.

Figure 2:
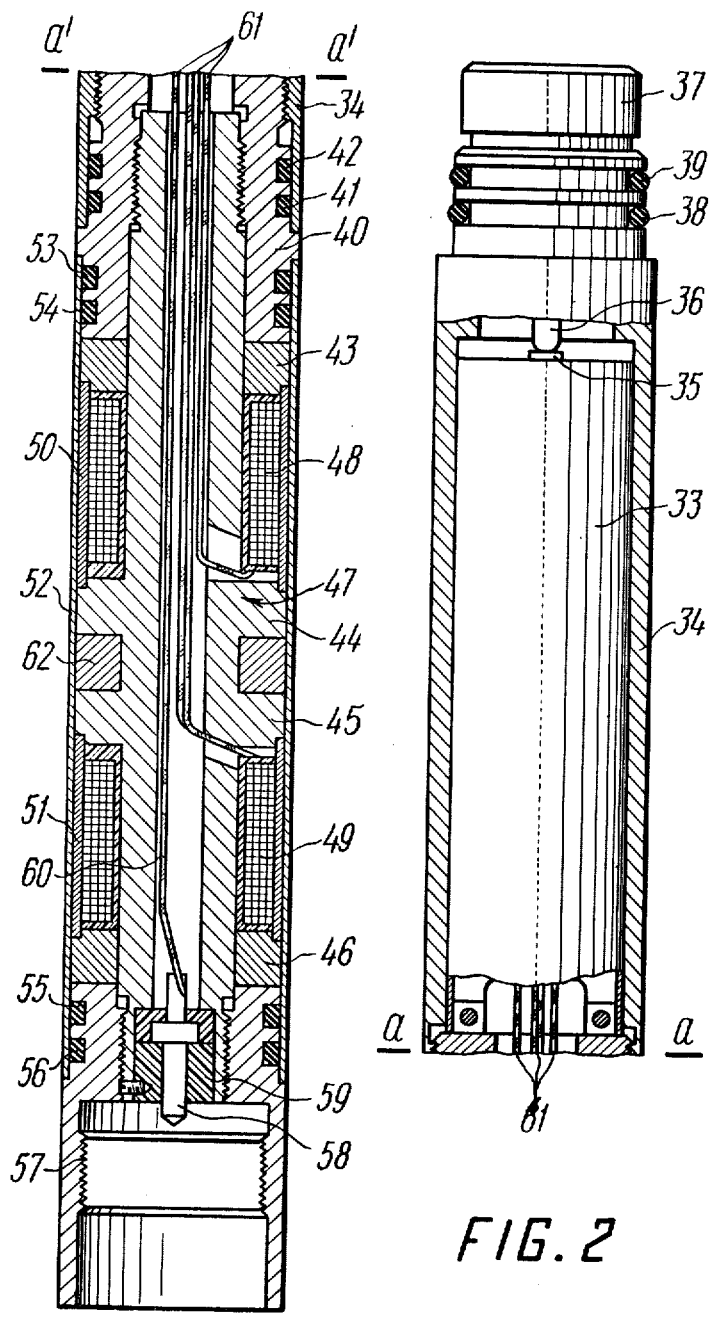

The invention will now be described in details with reference to specific embodiments illustrated in the accompanying drawings, in which:

FIG. 1 shows a wiring diagram of the apparatus according to the invention;

FIGS. 2, 2' show a longitudinal section of the apparatus according to the invention.

Referring to FIG. 1, the apparatus comprises two transformers A and B which are mounted in a fixed position relative to each other and have magnetic circuits 1 and 2 with two windings wound on each magnetic circuit: primary windings 3 and 4 and secondary windings 5 and 6. Open magnetic circuits of the both transformers A and B are completed by a wall of a well casing which is checked-up as regards the continuity of metal. A casing string comprises pipes 7 and 8 interconnected by a coupling 9. The secondary windings 5 and 6 of the both transformers A and B have different number of turns and are connected oppositely in series (at a point 10) so that the beginning of one winding is connected to the beginning of the other (or the end of one winding is connected to the end of the other). An electrical capacitance element - a capacitor 11 is connected in parallel with these windings at points 12 and 13.

The end of the winding 6 is connected to the input of an electronic amplifier circuit, that is to the base 14 of a transistor 15. The winding 5 is connected, at the point 13, to a resistor 16 and capacitor 17. Resistors 16 and 18 form a voltage divider for biasing the transistor 15.

The primary windings 3 and 4 of the both transformers having identical number of turns are matchingly connected in series at a point 19. The end of the winding 4 is connected, via a point 20, to the output of the electronic amplifier circuit, that is to the collector 14' of the transistor 15. The winding 3 is connected to a voltage stabilizer 21 stabilizing the circuit supply voltage, the stabilizer being connected, via a resistor 22 and a diode 23, to a single-wire cable (not shown) which is connected to a point 24. The interconnected windings 3 and 4 are shunted by a diode 25 protecting the transistor 15 against overload.

The output of the transistor 15 is connected, via a resistor 26, to an emitter follower composed of a transistor 27 and a resistor 28. A capacitor 29 is connected to the input of the transistor 27. The output of the transistor 27 is connected, via a capacitor 30 and a diode 23, to the cable at the point 24. A diode 31 for connecting another measuring instrument, such as a flow meter to the cable is also connected to the point 24.

The outer shielded sheath of the cable is connected to a terminal 32 of the apparatus. The entire electric part of the apparatus is made in the form of an independent unit (FIG. 2) enclosed in a casing 33 and accommodated in a housing 34. The electronic unit is provided with a contact 35 corresponding to the terminal 24 in FIG. 1.

This contact 35 is in contact with a spring-loaded contact 36 which ensures reliable connection with a cable head (not shown in the drawings). The apparatus is connected to the cable head by means of a detachable threaded coupling 37 and is sealed against the action of the well medium by means of sealing rings 38 and 39.

The housing 34 of the apparatus is screwed on an adapter 40 (FIG. 2') made of a non-magnetic material, such as brass, and is then sealed by means of rings 41 and 42.

The magnetic circuits 1, 2 of the transformers A and B (FIG. 1) are made of a magnetically soft material and comprise a set of pole pieces of round cross-section 43, 44, 45, 46 (FIG. 2') having a common rod 47. The windings 3, 4, 5, 6 are placed in windows 48 and 49 of the transformers A and B, respectively. The windings are surrounded by screens 50 and 51 made of a non-magnetic stainless steel. The transformers A and B are sealed by a jacket 52 which is also made of non-magnetic steel and sealing rubber rings 53, 54, 55, 56. The bottom portion of the apparatus (FIG. 2') is provided with a threaded adapter 57 and a contact 58 mounted in an insulating bush 59 for connecting another instrument. The contact 58 is also connected, by means of a conductor 60, to the contacts 35, 36. The transformers A and B are connected, by means of wires 61, to the electronic unit accommodated in the casing 33.

The magnetic circuits 1, 2 (FIG. 1) of the both transformers A and B are separated by a slot 62 (FIG. 2') filled with a non-magnetic material, such as plastic or brass so as to prevent the deformation of the jacket 52 under the action of external pressure.

The apparatus according to the invention functions as follows:

If there is no discontinuity in the pipe metal, the reluctance of the magnetic circuits of the transformer remains unchanged. Due to the difference in the number of turns of the secondary windings 5 and 6 and to the matching connection of the windings and amplifier, there is a positive feedback between the output and input of the transistor 15, that is between the collector and base circuits thereof. The amount of the positive feedback is defined by the value of $K\beta$ and is selected on the basis of the condition $K\beta > 1$, wherein K is gain of the output signal, and $\beta$ is resultant transformation ratio of the both interconnected transformers which is determined as the ratio between the signal value at the output of the oppositely serially connected windings 5 and 6 and the value of signal at the external terminals of the primary windings 3 and 4, that is the signal between the point 22 and the junction point of the resistors 16 and 22.

This condition provides for a stable relaxation mode of sustained oscillations at the output of the transistor 15. The greater the difference in the number of turns of the secondary windings 5, 6, the greater the value of $\beta$. Due to a strong positive feedback the entire system composed of the transformers and the transistor 15 operates in the oscillating mode which is very close to the blocking-oscillator mode. Depending on the values of the capacitors 11 and 17, either free-running continuous or discontinuous oscillation mode may be maintained. The apparatus can operate in the both above-mentioned modes.

A discontinuity of metal in the pipe will result in a disturbance of the magnetic symmetry of the transformers magnetic circuits and in a change in the ratio between the signal values at the output of the secondary windings 5, 6, that is in a change of the value of $\beta$. This, in turn, will cause a change in the mode of the relaxation oscillation of the transistor 15 and a change in the signal frequency at the output thereof. The frequency of the generated oscillations decreases or increases as referred to the initial frequency depending on the fact in what of the transformers the magnetic circuit reveals a discontinuity of metal. Thus, in one case the transitional phenomena in the transformers system are accelerated, and in the other case they are decelerated. In the former case this will result in an increase in the frequency of the generated oscillations, and in the latter case - in a decrease in the frequency of the generated oscillations.

As the apparatus passes by a coupling of the casing string, a total change in the frequency of the output signal in the astable continuous oscillations mode, for instance, is up to 250–300 Hz with the initial frequency of 600 Hz. A perforation hole in the pipe causes a change in the frequency of the output signal of 10–20 Hz.

The circuit composed of the resistor 26 and the capacitor 29 smoothes the rectangular output pulses at the output of the transistors 15 which are fed to the emitter follower. The output voltage from the resistor 28 of this emitter follower is fed, via the capacitor 30, to the cable, to the point 24 via the diode 23. The power supplied to the circuit is stabilized by the voltage stabilizer 21, the damping resistor 22 of the voltage stabilizer 21 preventing the short-circuiting of the output signal.

An important advantage of the apparatus according to the invention consists in substantially complete elimination of changes in the frequency of the output signal, with the pole pieces of the both transformers being spaced from the pipe wall at the same distance. Therefore, upon an accidental displacement of the apparatus in the direction normal to the longitudinal axis of the pipe being checked, there will be no change the output signal frequency.

In the discontinuous oscillations mode, which is obtained with a decrease in the capacitance of the capacitors 11 and 17 below a predetermined critical value, the sensitivity of the circuit is considerably higher due to a material change in the frequency of additional high-frequency oscillations accompanying the blocking-oscillator mode. In this case the capacitor 29 should not be used, since it would short-circuit high-frequency oscillations.

However, the continuous oscillations mode is preferable for checking up the location of couplings and holes in the pipe since the sensitivity of the apparatus is sufficient also in this case; in addition, when operating in this mode, the circuit of the receiving apparatus disposed on the surface is simpler and cheaper.

The sensitivity of the circuit is also improved due to the employment of the screens 51 and 52 (FIG. 2') made of a metal having a higher resistivity than, for instance copper or aluminium. These screens, which are made of stainless steel, reduce the influence of leakage fluxes, because the greater leakage fluxes and the smaller the fraction of the magnetic flux, which permeates the pole pieces of the magnetic circuits, the lower the sensitivity of the apparatus. It should be noted that the use of the copper screens is not desirable since in that case the screen would perform as a short-circuited loop which may result in the interruption of the generation.

What is claimed is:

1. An apparatus for checking-up the continuity of metallic pipes comprising: means for inducing magnetic field in the pipe being checked, said field being changed upon the occurence of a discontinuity in said pipe, and a converter for converting a change in the magnetic field into an electric signal carrying the information on the discontinuity of said pipe, said means and said converter comprising two transformers with open magnetic circuits mounted in a fixed position relative to each other, the magnetic circuits of said transformers being completed during the checking-up by the body of the pipe being checked, and an electronic amplifier circuit with positive feedback formed by the windings of said transformers, the primary windings of said transformers being matchingly interconnected and coupled to the output of said electronic amplifier circuit, and the secondary windings of said transformers having different number of turns being oppositely connected in series and coupled to the input of said electronic amplifier circuit, the ratio between the number of turns of said primary windings and the difference in the number of turns of said secondary windings complying with the condition $K\beta > 1$ wherein K is gain of said electronic amplifier circuit, and $\beta$ is resultant transformation ratio of the system of the interconnected transformers, whereby, upon the occurence of a discontinuity in the pipe being checked, the frequency of the electric signal at the output of said electronic amplifier circuit is changed.

2. An apparatus according to claim 1, wherein the windings of said transformers are surrounded by screens of nonmagnetic stainless steel.

* * * * *